INVENTORS
ELMER W. HALVORSEN
FRANK S. RUSSELL
By Clayton L. Jenks
ATTORNEY

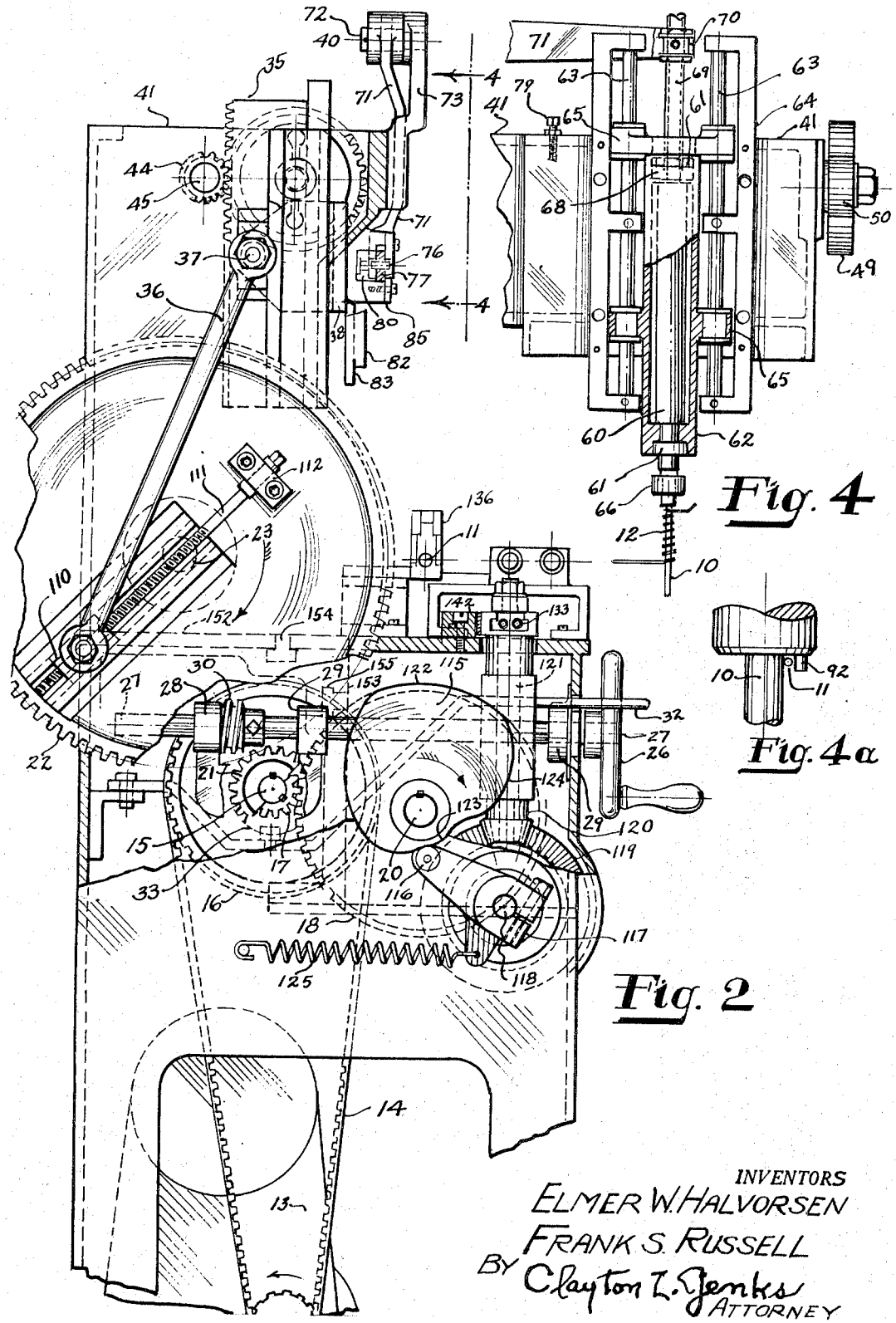

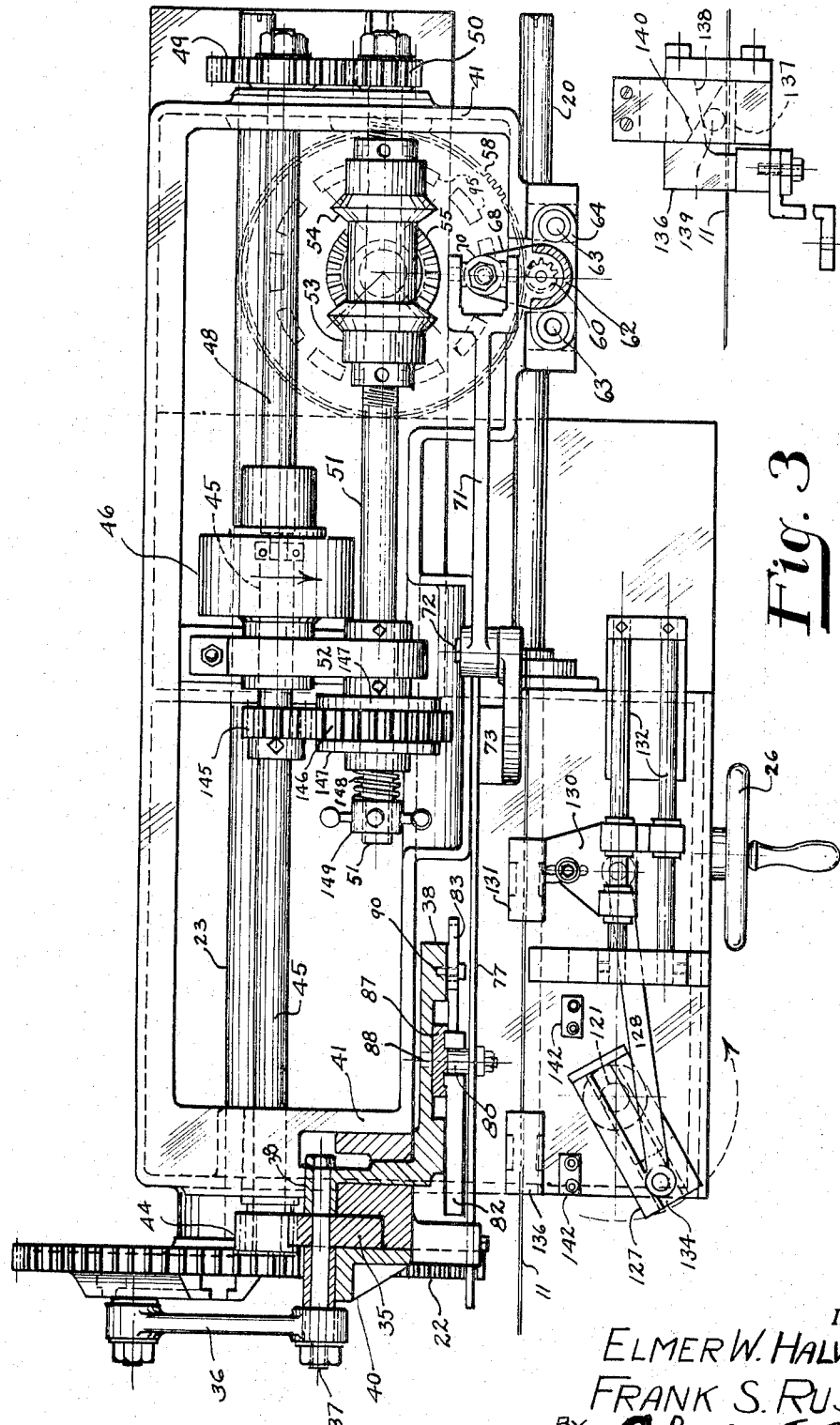

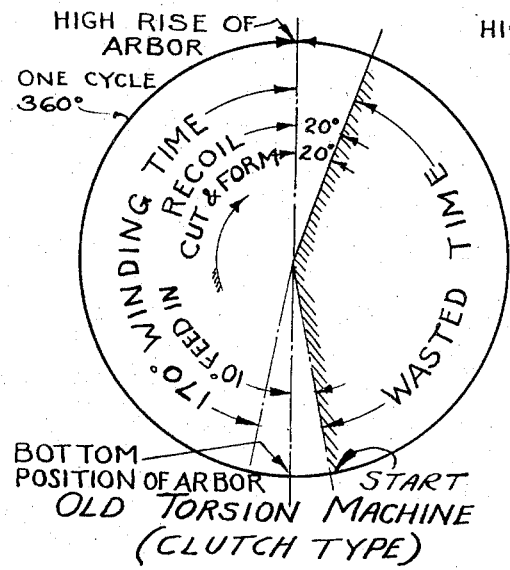
Fig. 9 — OLD TORSION MACHINE (CLUTCH TYPE)
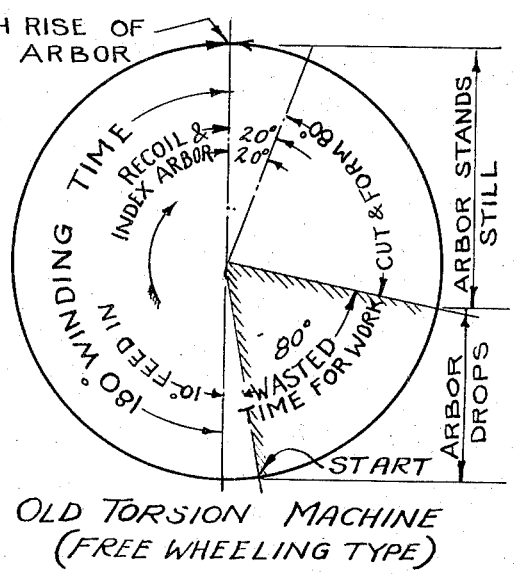
Fig. 10 — OLD TORSION MACHINE (FREE WHEELING TYPE)
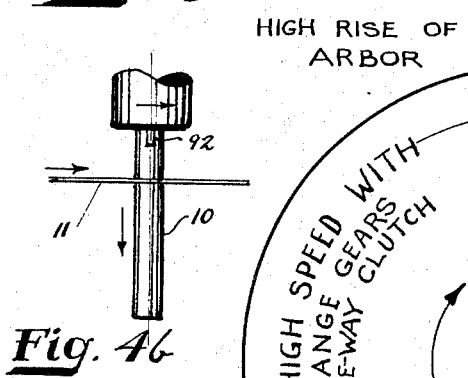
Fig. 4b
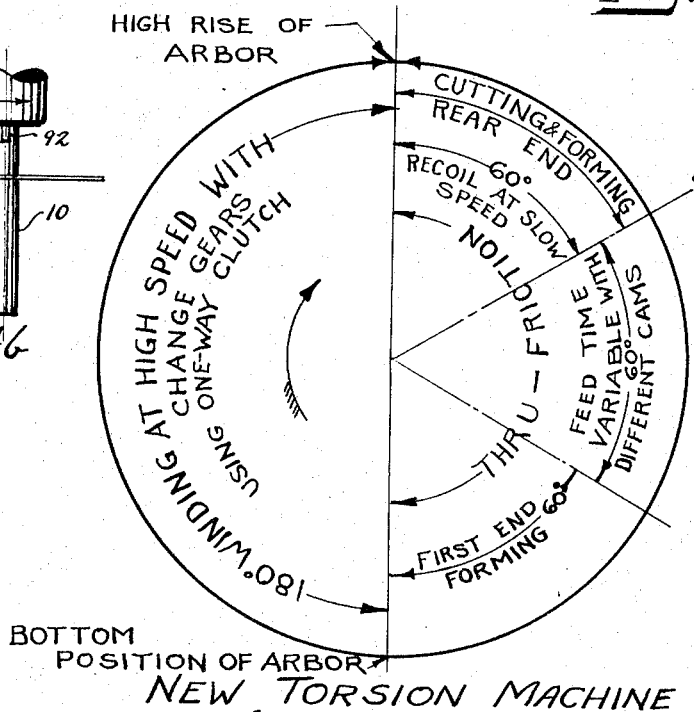
Fig. 11 — NEW TORSION MACHINE (SLOW RECOIL TYPE)

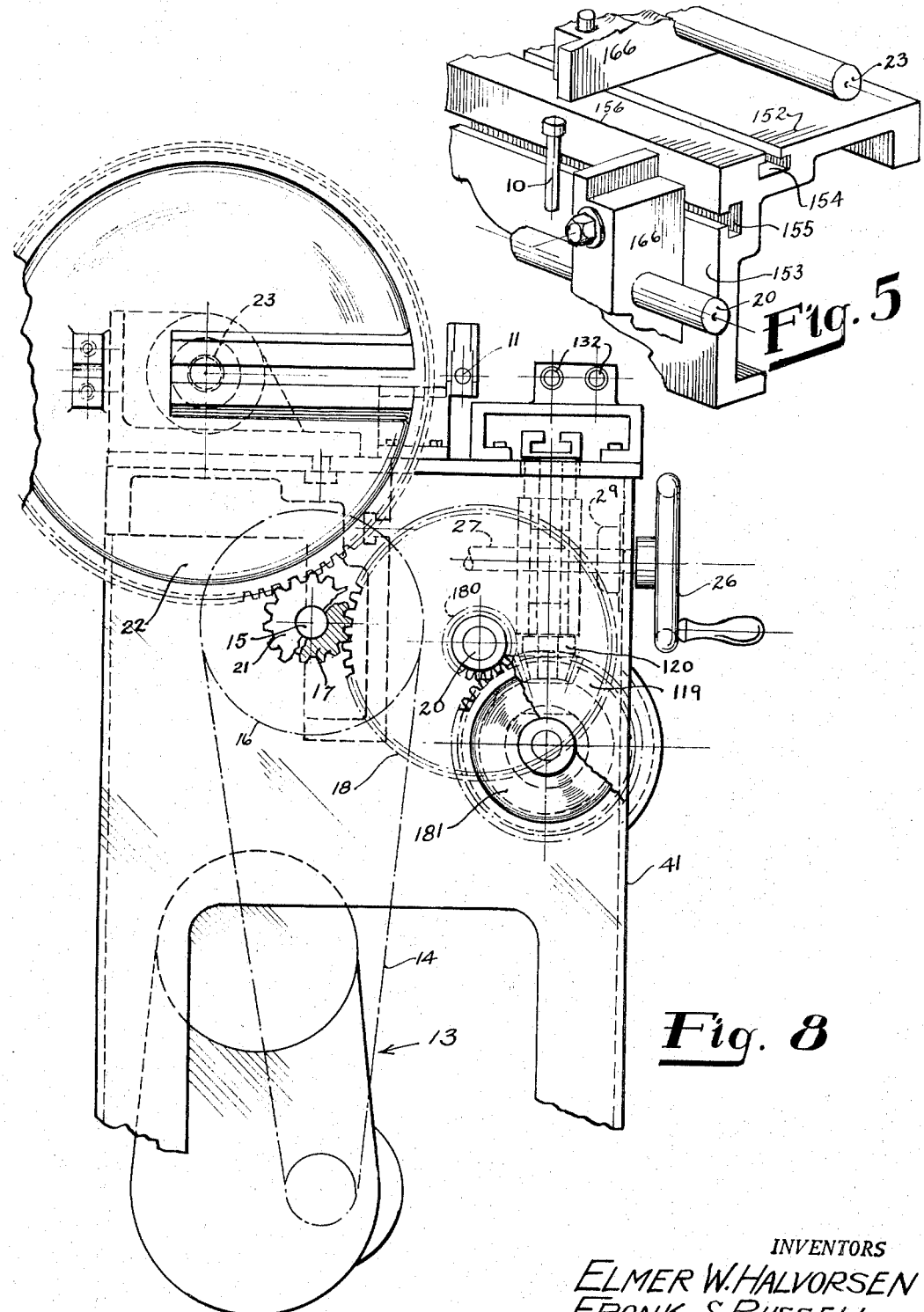

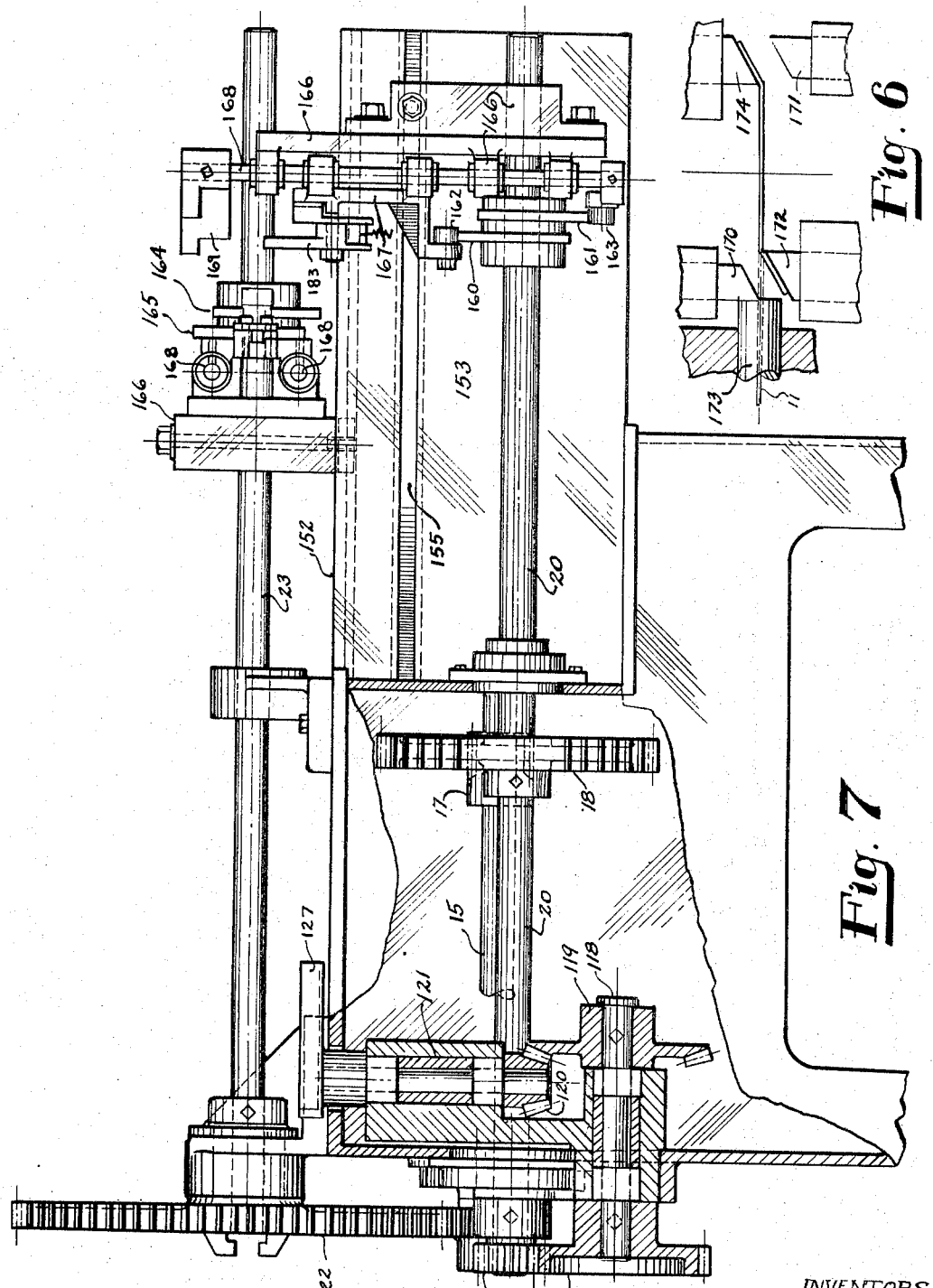

United States Patent Office 3,351,101
Patented Nov. 7, 1967

3,351,101
WIRE FORMING MACHINE
Elmer W. Halvorsen, Palmer, and Frank S. Russell, Holden, Mass., assignors to Sleeper and Hartley, Inc., Worcester, Mass., a corporation of Massachusetts
Filed Dec. 3, 1964, Ser. No. 415,661
12 Claims. (Cl. 140—1)

ABSTRACT OF THE DISCLOSURE

In a wire helix forming machine, the arbor is rotated rapidly to wind the helix and then in a reverse recoiling direction at a controlled slower rate to release the tension in the helix and provide adequate time for cutting the wire and forming an end of the helix. The forming tools are interchangeably mounted on either or both of two tables arranged at an angle to each other adjacent to the winding zone.

---

This invention relates to a wire forming machine and more particularly to a machine capable of forming a wire as a helical coil and fashioning shaped ends thereon.

As shown in the patent to Blount and Fisher 2,163,019 of June 20, 1939, a torsion spring or helical coil is coiled on a rotating arbor as the latter is moved axially in one direction by means of a crank and a driven rack bar, after which the arbor is moved endwise in the opposite direction and its rotation is reversed. During this return stroke of the arbor the helical wire thereon recoils, and the coil is cut from the infeeding wire and the free rear end of the coil wire is formed. In that machine, the crank drive provides for coiling the wire during an 180° revolution of the crank, but there is only a short time available for both cutting off the coil and forming its free end, and much of the time of the return stroke is wasted.

One object of our invention is to provide adequate time for the recoiling of the wire and for cutting off and forming the rear end of the wire coil.

The characteristics of different wires vary widely, and it is often undesirable to permit the tension in a coil to be released freely; hence another object is to provide a mechanism which controls the rate of recoil of a torsion spring after it has been wound.

A further object is to provide a rapid rotation of the arbor during the wire coiling step and a comparatively slow rotation during the recoil which provides adequate time for cutting and forming the end of the wire.

A further object of the invention is to provide a positive feed of a definite length of wire to and beyond the coiling zone for the formation of the forward end of the wire, after which the arbor and the driving pin descend to straddle the stationary previously positioned wire and start the coiling step.

Another object is to provide a directly connected efficient driving mechanism between two cam shafts which causes their intermittently heavy duty operations to be performed with the minimum of gear back-lash.

In multiple slide wire forming and coiling machines the tools for forming the wire, such as a bent end or a loop at the end of a helical coil, are mounted on a single table and are cam driven for movement in one plane, and it is difficult without the use of complex tools to form end portions of a wire helix in planes at an angle to each other. Another object of our invention is to overcome that difficulty and to provide a wire forming means in which comparatively simple tools may accomplish complex wire forming operations at various angles, because the tools are mounted on table surfaces arranged at an angle to each other. Other objects will be readily apparent in the following disclosure.

Referring now to the drawings illustrating preferred embodiments of the invention:

FIG. 2 is a fragmentary elevation of the left hand end of the machine;

FIG. 3 is a top plane view of the driving mechanism for the coiling arbor;

FIG. 3a is a detail of the mechanism which grips the wire for feeding it forward;

FIG. 4 is a fragmentary detail of the arbor rotating and reciprocating mechanism;

FIG. 4a is a fragmentary enlarged detail showing the arbor and driving pin in a wire coiling position;

FIG. 4b is a similar view showing the coiling parts prior to their engaging the wire;

FIG. 5 is a fragmentary perspective view of the two tables which support the wire forming tools;

FIG. 6 is a fragmentary diagrammatic detail showing the operation of the tools which form both ends of the wire coil;

FIG. 7 is a fragmentary elevation partly in section of a modification of the mechanism which drives the cam shafts of the wire forming tools;

FIG. 8 is an end elevation of the structure of FIG. 7; and

Figure 1:
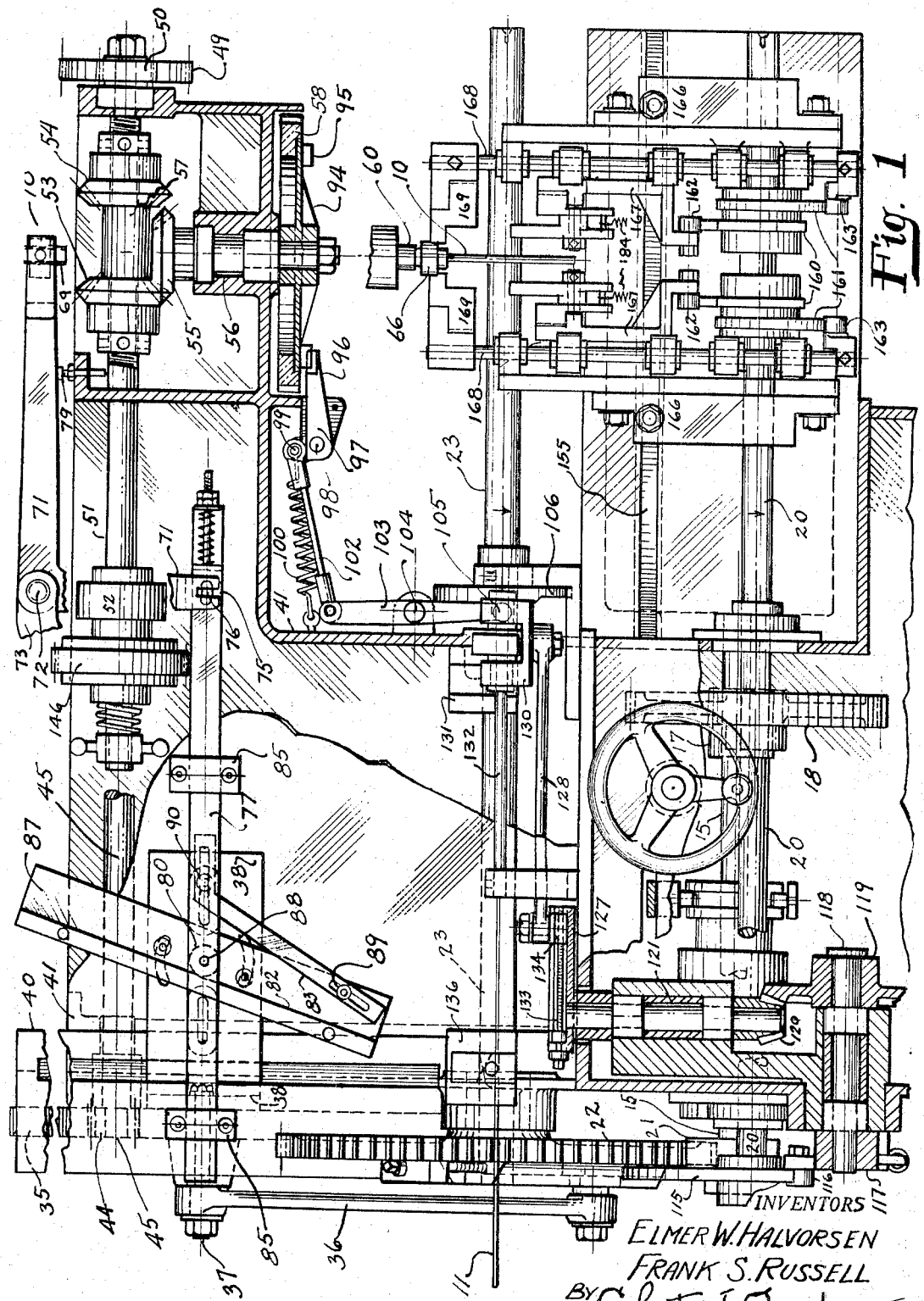
FIG. 1 is a fragmentary vertical elevation, partly broken away, of the machine.

FIGS. 9, 10, and 11 are timing charts showing the operations of the old and new machines.

Arbor rotating and coiling mechanism

Referring first to FIGURES 1–4, the coiling mechanism comprises a reciprocable and rotatable arbor 10 which draws forward and winds the wire 11 as a helical coil 12, thus forming a torsion spring. This arbor 10 is rotated rapidly in a spring winding direction and slowly in a reverse direction for recoiling or revealing the tension in the coiled spring and to provide time for forming the rear end of the coil and feeding wire forward for another coiling step. The power mechanism for rotating the spindle (FIG. 2) comprises a suitable source of power working through a Reeves or other suitable variable speed drive 13, as is well understood. From the Reeves drive, a timing belt 14 transmits power to a drive shaft 15 by means of a large gear 16 keyed on that shaft. A pinion 17 keyed on the shaft 15 meshes with a large gear 18 keyed on a main tooling cam shaft 20. On the left hand end of the shaft 15 is a pinion 21 which meshes with a large gear 22 fixed on the upper main tooling shaft 23. Thus, the drive shaft is located immediately between the two cam shafts and drives them directly with the minimum of back-lash. The two shafts 20 and 23 are rotated at the same speed by means of their respective gears. That is, the small pinion 17 on the shaft 15 which, for example, as 15 teeth meshes with the gear 18 provided with 75 teeth. The gear 21 as 30 teeth and meshes with its driven gear 22 which has 150 teeth; hence, this 5 to 1 ratio insures that the two shafts 20 and 23 rotate at the same speed.

For the purpose of moving the driving mechanism manually, a hand wheel 26 (FIG. 2) is mounted on a shaft 27 which in turn is axially slidable through suitable bearings 28 and 29. This shaft 27 carries a worm 30 adapted to be moved into mesh with a gear (not shown) mounted on the shaft 15 behind gear 21. Hence, by pulling the hand wheel outwardly, the worm may be meshed with its mating gear for rotating the shaft 15 manually in a forward direction. When the machine is to be started by power, a starting lever 32 serves to move a suitable disengaging clutch 33 and the worm wheel on shaft 15 acts like a rack bar and the power thrusts the worm 30 towards the left and thus disconnects the parts. Therefore, as the machine runs there is no danger of the operator being hit by the hand wheel handle. The worm 30 thus moves from contacting the bearing 28 when it is inoperative into contact with a bearing 29 when it operatively drives its mating gear.

The large gear 22, which is keyed on the end of the upper cam shaft 23 and rotates at the rate of the lower cam shaft 20, serves to reciprocate a vertical rack bar 35 which in turn is connected to drive the rotatable arbor 10. The large gear 22 carries a pitman 36 pivotally connected at its upper end to a through pin or bolt 37 which passes through the rack bar 35 and carries an L-shaped cam mounting 38 to be described later. The rack bar 35 is slidably mounted in suitable guides 40 (FIG. 1) carried by the frame 41 of the machine.

The rack bar 35 meshes with a pinion 44 (FIG. 2) on a shaft 45 which terminates in a suitable one-way clutch 46 (FIG. 3) connected to rotate the arbor in a wire coiling direction. A further shaft 48 (FIG. 3) aligned with shaft 45 is driven by the over-running clutch 46 in a counter clockwise direction only. At the right hand end of shaft 48 is a gear 49 meshing with a gear 50 on a further shaft 51 parallel with shaft 48 which is suitably mounted at its right hand end in bearings in frame 41. The gears 49, 50 are removable change speed gears intended to change the rotational speed of the arbor. The left hand end of the shaft 51 and the right hand end of shaft 45 are mounted in bearings suitably arranged in a standard 52 carried by the housing frame. The right hand end of shaft 45 projects through the bearing 52 and terminates in the one-way or over-running clutch 46, of suitable construction such as a "Hilliard" or "Sprag" clutch which can drive in only one rotative direction.

As indicated by the relative sizes of the change gears 49 and 50 (FIG. 3) the shaft 51 is driven at a higher speed than is the shaft 45 and thus serves to rotate the arbor at a comparatively high speed in a wire coiling direction. The shaft 51 carries two mitre gears 53 and 54 slidable keyed thereto, one of which is to be moved axially into mesh with a further mitre gear 55 on a short vertical stub shaft 56 (FIG. 1) suitably carried by the frame. By suitably adjusting the gears 53 and 54 axially and securing one of them in mesh with gear 55, the hand of the coil may be changed from left to right. A spacing collar 57 maintains a proper spacing of the gears 53 and 54.

On the lower end of shaft 56 (FIG. 1) is a ring gear 58 which meshes with an elongated pinion 60 (FIG. 4) carried in bearings 61 in a slide housing 62 which in turn is slideably mounted on two vertical parallel bearing rods 63 supported in a housing 64 carried by the frame 41. The housing 62 has projecting ears 65 carrying suitable antifriction bearings which slide on the rods 63. The housing 62 is cut away to permit meshing of the large ring gear 58 with the elongated pinion 60. The spindle of the pinion 60 projects downwardly through the lower bearing 61 and carries a suitable chuck 66 which removably holds a correctly sized arbor 10 for coiling the wire. Various types of arbor construction and mounting may be employed.

*Arbor reciprocation*

The housing 62 has a projection 68 (FIG. 4) which is suitably connected to a vertical rod 69. The top end of the rod carries a rocking member suitably arranged to engage a yoke 70 on the end of a bell crank lever 71 which is pivoted on a stud 72 carried by a bracket 73 (FIG. 1) affixed to the frame. The rocking bell crank 71 has a slot 75 (FIG. 1) in its lower end which rides on a pin 76 projecting laterally from a sliding friction bar 77. The pin may be resiliently mounted to facilitate locating the lowermost position of the arbor. This downward motion is limited by a stop screw 79 (FIG. 1 and 4) carried by the frame which engages the underside of the bell crank when the latter is in its lowermost position. Various suitable constructions may be used to adjust the spindle and its arbor 10 vertically and to provide for the reciprocation thereof, such as is described in said patent.

The sliding movement of the bar 77 is caused by a cam roller 80 (FIG. 1) mounted on a pin on the side of the bar 77. That roller engages one of two inclined and preferably straight bar cams 82 and 83. The slide motion of the bar 77 is frictionally controlled by one or more friction gripping members 85 (FIG. 1). As is described in said Patent 2,163,019 the slide movement of the bar 77 is caused by the roller 80 thereon engaging one or the other of the inner cam surfaces of the inclined cams 82 and 83. These cams are mounted on the vertically reciprocable member 38 which is attached to the reciprocable rack 35 (FIG. 3) by the bolt 37 (FIG. 1). Hence, as the cams reciprocate vertically they slide the bar 77 horizontally and rock the bell crank and reciprocate the arbor 10.

The cam member 82 is secured to a plate 87 (FIG. 1) which is pivoted at 88 on the cam plate mount 38 and so arranged as to vary the inclination of the cam 82, which effects the horizontal movement towards the right of the slide bar 77 and controls the pitch of the helical spring 12 or work piece being coiled. When the cam mount 38 moves downwardly, the roller 80 on the bar 77 rides on the straight cam surface 82 and pushes the bar 77 to the right and thus rocks the lever 71 upwardly at that end which carries the spindle and arbor during the wire coiling step. A second straight cam bar 83 is pivoted at 89 on the plate 87 and so adjustably arranged that its inclination may be varied. The cam 83 is held in position by means of a clamping bolt 90 carried by the member 38 and adjustably mounted in a slot in the bar. It will be understood that when the member 38 moves upwardly with the rack bar 35, the roller 80 will leave the cam 82 and the slide bar 77 will stand still because of the friction plate 85, until the roller 80 engages the lower cam 83, whereupon the arbor will be moved downwardly until the driving pin 92 and the arbor 10 straddle the previously positioned and stationary wire. The rotation of the arbor has been so timed and the adjustments so set that after the front end of the incoming wire has been fed forward before the beginning of the forming and coiling cycle, the driving pin 92 (FIG. 4a) will be in a correct position for engaging the wire 11 and forcing it to be coiled around the arbor. This pin 92 is parallel to the spindle 10 and spaced therefrom so as to engage the wire 11 and coil it about the arbor 10.

*Arbor rotation stop mechanism*

In order to insure the correct location of the driving pin 92 in relation to the incoming wire 11 a circular stop plate 94 (FIG. 1) is provided with twelve equally spaced stops 95 so arranged as to stop the rotating arbor always in a correct position for the drive pin 92 to engage the wire, irrespective of which stop is engaged. That is, the stops 95 are spaced to provide single 360° rotations of the arbor and thus stop the driving pin 92 always in position for accepting the wire when the stop plate becomes stationary. As indicated in FIG. 4a, the space between the pin 92 and the arbor 10 is open to accept the incoming wire. Hence, instead of having to thread the wire into the arbor, like threading a needle, the arbor and its driving pin drop down onto the wire already in position for the next coiling operation. The position of the pin and wire prior to engagement of the pin with the wire is indicated in FIG. 4b, and the downward movement of the arbor continues during the forming of the front end of the wire after it has been moved into correct position therefor. The construction and operation of a similar stop plate are set forth in said Patent 2,163,019, and reference thereto may be had for a further description.

As shown in FIG. 1 the bell crank lever 97 is pivoted at 98 on the frame, and its short end 99 has a spring 100 attached thereto and to the frame 41 which thus serves to urge the stop finger 96 upwardly into engagement with a stop on the underside of stop plate 94. The same crank end 99 is connected through a link 102 with one end of the rocking lever 103 mounted on the framework at 104. The other or lower end of the lever 103 has a cam roller 105 engaging the cam surface on a plate 106 keyed on and rotated by shaft 23 which is so shaped that it holds the stop plate unlocked during the revolution of the cam shaft until the proper time for engagement of the stops. The stop finger is moved by spring 100 into a locking position only as permitted by cam 106 after the spring 12 has recoiled.

The number of turns in the coil 12 is governed by the distance of reciprocation of the rack bar 35. This distance is varied as shown in said Patent 2,163,019 by varying the throw of the crank arm 36. That is, the crank arm is pivotally connected to a slide block 110 (FIG. 2) which is adjustably positioned radially of the gear 22 by means of a screw 111 threaded into the block and having its end held by collars and a clamping cap 112. By moving the block 110 nearer the center of rotation of the gear 22 a lesser number of turns of the coil will be made.

Wire feed mechanism

One feature of this invention involves moving the front end of the wire 11 forward to a position adjacent and tangent to the arbor 10 and then lowering the arbor so that the driving pin 92 and the arbor 10 straddle the wire 11 while the arbor, as above stated, is rotatively stationary. At this moment, the arbor has reached its lowermost position and it then starts moving upwardly for coiling the wire. This requires moving the wire horizontally into position before the driving pin 92 engages it. To feed the wire through an exact distance, we provide a cam 115 (FIGS. 1 and 2) which engages a roller 116 mounted on a swinging arm 117 clamped onto a stub shaft 118. The opposite end of the stub shaft 118 carries a bevel gear 119 which meshes with a small pinion 120 mounted on the lower end of a vertical shaft 121 which is suitably supported in bearings in the machine. The cam 115 on the cam shaft 20 is rotated at the same speed as the upper tooling cam shaft 23 and the pitman drive gear 22. The cam has two cylindrical portions, a high dwell surface 122 and a low dwell surface 123 connected by a rise 124 which causes the cam arm 117 to move rapidly. A helical spring 125 suitably fastened to the framework and the roller arm 117 holds the roller 116 against the cam 115.

The vertical shaft 121 (FIG. 1) carries at its upper end a horizontal arm 127 which carries one end of a pitman 128. The latter is pivotally connected to a slide 130 carrying a wire gripping unit 131 suitably mounted on two parallel guide bars 132 (FIG. 3). The length of wire moved forward by the gripping unit is varied by means of a variable throw member on the arm 127. That is, the arm carries two adjusting push and pull screws 133 (FIG. 1) which are threaded into a fulcrum block 134 on which the adjacent end of the pitman 128 is pivotally mounted. The push and pull screws 133 are suitably carried by the arm 127 and by means of their adjustment the throw of the pitman 128 is regulated.

A stationary gripping unit 136 is arranged to prevent the wire from moving backwards. These two gripping units 131 and 136 are made alike, the fixed unit 136 being shown in FIG. 3a. This comprises a substantially U-shaped jaw formed by a horizontal plate 137 and an upper arm providing an inclined surface 138. The wire 11 passes through an opening into contact with the lower plate 137. A roller 139 above the wire is forced rearwardly between the wire and the upper centrally located inclined surface 138 and thus wedged against the wire. This prevents back movement of the wire. The movable gripper 131 causes the wire to move forward when the gripping unit is forced toward the right by the pitman 128. When the pitman moves toward the left, the roller 139 releases the wire, and the latter is held stationary in its new position by means of the left hand gripping unit 136. The roller 139 is prevented from escaping during the backward movement of the gripping unit 131 by means of two spaced parallel inclined surfaces 140 adjacent to the ends of the roller 139 and outside the surface 138. Various other suitable wire gripping mechanisms may be employed for the purpose, provided they serve to feed a definite length of wire forward on each forward motion of the pitman.

By suitable adjustment of the screws 133 on the revolving plate 127, a predetermined and accurately measured length of wire may be moved forward at each reciprocation of the pitman 128. The wire is fed beyond the coiling arbor to the required extent for forming a shaped end thereon as will be explained. The arm 127 has a 180° revolution and comes to rest against one of two stop blocks 142 which limit its swinging motion between definite wire feeding positions.

Recoil mechanism

An important feature of the invention, as above stated, involves coiling the wire rapidly and then permitting it to recoil under the control of the arbor which is rotated slowly. If the wire is allowed to recoil without control the sizes of the coils may vary, as has been found in the past. Hence, it is important to release tension in the coil gradually and cause it to recoil to an exact predetermined extent. Furthermore, a comparatively slow recoil provides time for forming the end of the wire.

To provide the slow motion recoil, the clutch 46 (FIG. 3) serves to drive the shaft 48 only in a forward wire coiling direction as shown by the arrow in FIG. 3. This occurs during the down motion of the rack bar 35 and pitman 36. When the pitman reverses in direction to move the rack bar up, the shaft 45 drives through a small pinion 145 keyed thereon which engages a larger gear 146 freely mounted on the shaft 51. The latter gear drives the shaft 51 through two friction plates 147 mounted on the opposite sides of the gear. The right hand one of these friction plates is fixed to the shaft 51 and the other plate is pressed against the side of the gear 146 by means of a spring 148 adjustably tensioned by a wing nut 149 threaded on the end of the shaft 51. When the crank 36 moves on its return downward stroke, the over-running clutch 46 releases its grip on the shaft 48, and the drive is then through the reduction gears 145 and 146 whereupon the friction plates 147 rotate the shaft 51 in the reverse direction and the arbor turns in a direction opposite of that required for coiling.

During the forward coiling rotation of the arbor, the change gears 49 and 50 serve to rotate the arbor at a comparatively rapid rate, while the recoil motion as controlled by gears 145 and 146 is slow enough both to release the wire tension always at the same rate as well as to provide time for forming the rear end of the coil wire. During this recoil operation the shaft 48 is free within the over-running clutch 46. The friction drive plates 147 slip during the forward motion of winding the coil but on the reverse recoil stroke they take over the power drive of the arbor. To change the rate of recoil, the wing nut 149 (FIG. 3) is removed and the gear 146 as well as the friction plates may be replaced by suitable parts. Provision is also made for changing the gear 145, which, for example, may be a split gear that is easily removed. Various other types of change speed mechanisms may be employed to vary the recoil rate and provide time for the forming of the rear end of the coil wire.

Wire cutting and forming

A further feature of the invention involves arranging two slide surfaces at an angle to each other, such as 90°, on which are mounted the various slide tools used for cutting and forming the two ends of the wire helix. As shown particularly in FIG. 5 (see also FIG. 1) a work table on the machine frame is provided with two table surfaces 152 and 153 at right angles to each other. Each table is provided with a conventional T-slot which serves for holding the selected tools in place. The horizontal slot 155 in the vertical surface 153 is located at a distance from the corner 156 between the two table surfaces which is the same as the distance from that corner to the other slot 154 in the horizontal table. Hence, a tool mounted in the slot 155 may be used to form a vertical bend in the wire, and if that tool is mounted in the slot 154 it will then form a similar bend in a horizontal direction.

As shown in FIG. 1 the two tool operating cams 160 and 161 are mounted on the lower shaft 20, and these cause the cam rollers 162 and 163 to move the various tool slides arranged on the tool mount 166. The cam rollers 163 are suitably connected with the tooling devices to move those tools vertically which are mounted on the vertical table 153. The upper cam shaft 23 carries suitable cams 164 and 165 as shown in FIG. 7, which are arranged to operate tools mounted on the horizontal table 152. The several tool slides are shown as mounted on slide rods 168 (FIGS. 1 and 7).

A conventional wire cutting tool (FIG. 6) comprises a blade 170 moving close to and cutting against the open end of a guide tube 173 through which the wire projects. Also, a standard simple type of forming tool 172 comprises a shaped member forming an anvil over which the wire is bent by the shaped end of the cutter 170. A movable tool 171 engages and shapes the front end of the wire on an anvil 174. The conventional mounts are so constructed and arranged that a tool may be mounted on either side of the coiling arbor in both planes and they will serve, because of the two tables, to bend the wire in any one of the four directions of perpendicular radii of a circle. Thus, the wire ends may be shaped as desired and on both sides of the arbor by means of relatively simple cam operated slides.

In the structure shown (FIGS. 1 and 7) the slide rods 168 are mounted for sliding through anti-friction bearings carried by lugs fixed to a plate forming a part of the tool mount 166. That rod 168 is moved by the cam 161 and follower 163. A tool block 169 carried on the upper end of the rod 168 is thus moved in one direction. A suitable spring serves to hold the follower against its cam and move the slide rod in the opposite direction. The other cam 160 and spring 184 act through its follower 162 to move a bracket 167 which carries a tool holder 183 suitably arranged for supporting a tool. That bracket 167 has lugs provided with anti-friction bearings which are arranged to slide on the slidable rod 168. As illustrated duplicate slides and tools are arranged on opposite sides of the arbor 10. Also, similar tool slides are mounted on the upper table surface 152 and are operated by the cams 164 and 165 as indicated in FIG. 7. The two tables thus provide for mounting simply constructed various reciprocable tools for movement in any of the four quadrants, so that by cam operated forming tools one may shape a wire in any of those quadrant directions 90° apart. The tools and slides may be as desired and do not form a part of this invention, except as to the arrangement and operation of the cams which govern the tools. The double table arrangement and slide mounting is the novelty herein.

FIGS. 7 and 8 shows a simplified modification of the tool operating structure, the coiling mechanism being omitted, and which is so arranged that by replacing the cam 115 (FIG. 2) and associated arm 117 with suitable change speed gears 180 and 181, the shaft 121 may be rotated through 360° instead of the half turn provided by the cam 115. The stops 142 are omitted so as not to interfere with the full rotation of the shaft 121. The construction of the wire feeding mechanism is the same as above described. Hence, by this simple change, wire may be formed in any configuration which does not involve a coil. For example, one may form a bail for a pail by means of the construction of FIGS. 7 and 8, but if a loop or coil is to be incorporated in that handle, then the coiling mechanism above described is employed. In that modification, the gear train 16, 17 and 18 (see FIG. 2) serves to drive the shaft 20, and that shaft with its gear 180 (FIG. 7) drives the gear 181 on the stub shaft 118 which is connected to rotate the vertical shaft 121 and revolve plate 127 and reciprocate the pitman 128 and the wire grip 131 shown in FIG. 3. Hence, the wire may be fed and formed more rapidly, if the coiling mechanism is disconnected or omitted.

*Operation*

The operation of the wire forming machine will be apparent in view of the above description. In order to form wire as a helix 12 on the arbor 10, the main driven gear 22 is rotated at a suitable speed by its power mechanism. The crank arm 36 driven by the gear has its throw varied by means of the adjustment screw 111 (FIG. 2), and it serves to reciprocate the rack bar 35 through a predetermined stroke which determines the number of turns in the coil 12. The rack bar rotates the shaft 45 in opposite directions through a suitable gear 44 (FIG. 2) as it reciprocates. That shaft 45 operates through an over-running one-way clutch 46 to rotate the aligned shaft 48 which in turn serves to drive the shaft 51. The latter drives the vertical shaft 56 through mitre gears which are adjustably mounted on the shaft 51 for rotating the arbor in either direction for making right or left hand coils.

On the reverse upward stroke of the rack bar, the clutch 46 is free (FIG. 3) and the shaft 51 is driven at a slower speed through the reduction gears 145 and 146, which may be changed to vary the recoil rate. During the forward coiling stroke, the clutch plates 147 slip, but they engage the parallel sides of gear 146 to drive the shaft 51 during the reverse recoil stroke. Thus the wire is coiled rapidly, and on the slower reverse stroke adequate time is provided for the recoil as well as for the wire forming operations. Recoil occurs during the time while the arbor is axially stationary, because the cam roller 80 is out of contact with the upwardly moving cams 82, 83.

The free end of a supply wire is fed forward to a definite position beyond the coiling arbor by means of a cam 115 (FIG. 2) on the cam shaft 20 which is driven by a gear train meshing with the main gear 16. That cam is replaceable by other cams shaped in accordance with the requirements of the wire forming operations. The cam 115 rocks the cam arm 117 on the shaft 118 which through mitre gears serves to oscillate the adjustable stroke pitman 128 (FIGS. 1 and 3). This causes the wire gripper 131 to thrust the free end of the supply wire 11 forward through guide tubes (not shown) to a definite position. On the reverse stroke of the pitman 128, the wire gripper 131 disengages the wire and a similar stationary gripper 136 (FIG. 3a) prevents backward movement of the wire. The gripper cam 115 is timed to feed the supply wire forward after the helix has recoiled and after the helix has been severed and its rear end formed.

At the time when the forward movement of the wire terminates, the arbor is stationary as is caused by the stop finger 96 engaging one of the stops 95 (FIG. 1). That stop finger 96 is moved through a linkage by a cam 106 fixed on the cam shaft 23. Then the rotatively stationary arbor starts downward and the driving pin 92 and the arbor straddle the wire end as shown in FIG. 4a and the coiling operation starts as the arbor moves upwardly.

The timing is such that the arbor does not rotate after the recoil until the front end is formed and the driving pin has engaged the wire. When the wire stops in its forward movement toward the right, the forming tools 171 and 174 (FIG. 6) are cam operated to bend the forward end of the wire. At the end of the coiling operation, the forming tools, 170 and 172 at the left in FIG. 6, cut the wire against the end of the tube 173 and then shape the rear end of the wire coil.

The recoil of the wire helix 12 occurs only during the return stroke or upward movement of the rack bar 35 and the cams 82 and 83, and the cam 106 for the spindle stop 96 is timed to stop the arbor rotation only after the recoil. The feed of a fresh supply of wire takes place after the recoil. The arbor travels rapidly downward only near the end of the upward return stroke of the rack bar as determined by the cam 83. It is stationary axially while the cam roller 80 is free from both cams 82 and 83. Hence there is ample time between the wire feed action and the beginning of coiling for the front end forming. This eliminates waste time and there is ample time during the return stroke for all of the operations except coiling.

The forming or wire bending tools are mounted in T-slots on the two tables 152, 153 (FIG. 5) which are arranged at an angle to each other, such as 90°, so that the tools operated by the cam shafts 20 and 23 will bend the wire ends in planes at an angle to each other corresponding with the angle between the two surface planes of the tables. The wire bending tools are selected and adjusted in accordance with the requirements of any particular operation. They may be slideably mounted on either side of the arbor and operated in two planes for shaping either end of the severed wire. The tool on the feed side of the arbor serves for last end forming and the tool on the opposite side of the arbor will form the front end of the wire. Hence, there are four positions for a tool on the two tables.

In the modifications of FIG. 7 and 8, the cam 115 and its associate parts have been replaecd by the gear set 180 and 181. This provides for a full 360° rotation of the shaft 121 and a corresponding movement of the pitman 128 which causes the wire feed. Hence the full cycle of revolution of the drive gear 16 is employed in feeding and forming the wire.

*Timing charts*

The timing operation of coiling machines may be best indicated by the charts in FIGS. 9, 10, and 11. In the operation of an earlier standard clutch type of torsion machine, as shown in FIG. 9, the sector at the bottom of the chart diagram represents about a 20 degree portion of the entire 360° machine cycle for the in-feed of the wire and front end forming, after which coiling takes place while the gear 22 rotates through 170° and the arbor moves to its uppermost position. The next 20° is employed for both the recoil of the helix and its severance from the infeeding wire and for forming the rear end of the wire coil. The remainder of the cycle time is wasted.

In a machine of the type shown in the Patent 2,163,019, known as the free wheeling type, the cycle of operations is approximately that shown in FIG. 10. If the feed is started at the point indicated near the bottom of the diagram and going in the direction of the arrow it will be noted that about 10° of the total cycle is used for feeding in the wire and forming the front end. After 180° is used to coil the wire, then about 20° of time is used for the recoil and indexing the arbor for receiving the wire after which about 80° is allowed for cutting and forming the rear end of the wire. The remaining 80° is wasted time.

In the new slow recoil machine herein described, as shown in FIG. 11, and starting the operation at the point labeled "Start" it will be noted that 60° of the cycle of gear 22 and the rack bar 35, is available for feeding the wire forward. Then another 60° may be used in forming the forward end of the wire. By the end of this time, the arbor has dropped to its lowermost position and the driving pin 92 has engaged the wire as above described. Then, the wire is coiled during 180° of the cycle, the number of turns in the coil being determined by the length of stroke of the rack bar 35. At the high rise of the arbor and top of the diagram, the reverse drive is taken over by the friction plates 147 and the reduction gears 145 and 146. During this slow speed recoil time of approximately 60°, the wire is cut and the rear end of the coil is formed, thus completing the cycle with no wasted time.

In the modification of FIG. 7 and 8 one half of the cycle is used in feeding the wire and the other half cycle is employed in forming and cutting the wire or carrying on other desired operations. Hence, the entire machine is available either for coiling or for use as a four slide machine for the forming of wire. Because of the angularly arranged tables, the wire may be formed in any of the four major directions with simplified tooling.

It will now be appreciated that various modifications may be made in the structure and that the above description of the principles underlying this invention and of preferred embodiments thereof is not to be interpreted as imposing limitations on the appended claims.

We claim:

1. A wire forming machine comprising a rotatable and reciprocable arbor, mechanism for reciprocating the arbor axially in a forward direction while wire is coiled thereon as a helix and in the opposite direction while the wire helix recoils, mechanism for rotating the arbor at a controlled rate in one direction for coiling the wire as a helix thereon, an associated mechanism for rotating the arbor in the opposite direction at a controlled and slower rate and thereby controlling the rate of recoil of the helix and a cam controlled forming tool operated in a timed relation with the recoil rotation of the arbor.

2. A machine according to claim 1 in which said associated mechanism includes change speed members whereby the rate of recoil may be varied.

3. A machine according to claim 1 in which the arbor rotating mechanism comprises a main shaft and a one-way clutch connected for rotating the arbor in a forward wire coiling direction, and a secondary shaft, a friction clutch, and lower ratio gears driven by the main shaft for rotating the arbor reversely in a recoil direction at a slower rate, said friction clutch slipping during the forward coiling movement.

4. A wire forming machine comprising a reciprocable and rotatable arbor, mechanism for reciprocating the arbor axially in opposite directions, mechanism for rotating the arbor in opposite directions, mechanism for feeding wire forward to a point beyond but close to the arbor, mechanism for stopping the arbor rotation after it has reached an end of a reciprocation stroke, remote from the infeeding wire, and a driving pin revolved with and spaced from the arbor for engaging the wire and winding a helix wire coil on the arbor, said reciprocating and wire feeding mechanisms comprising means for stopping the rotating arbor in position for gripping the wire and mechanism for moving the non-rotating arbor and the driving pin towards the wire to straddle the wire after the latter has been moved to its foremost position.

5. A wire forming machine according to claim 4 in which the wire feeding mechanism comprises a reciprocable releasable gripping member operable to grip the wire and move its end forward past the arbor and then release it and a second gripping member to prevent any backward movement of the wire.

6. A wire forming machine according to claim 1 comprising a cutting tool for severing the helix and forming the rear end of the wire which operates in synchronism with the recoiling stage, mechanism for feeding a supply wire forward for a further coiling operation, and cam controlled mechanism for forming the leading end of the wire, said coiling step consuming about one half of the machine cycle and the wire cutting, forming and feeding steps consuming the remaining portion of the cycle without material waste of time.

7. A wire forming machine according to claim 1 in which the arbor rotating mechanism comprises a driving power shaft, two driven shafts directly and separately connected by gears with said power shaft, said wire coiling mechanism being operated by one of said driven shafts, a wire forming device and an associated cam on the other driven shaft for shaping a wire end, said gear connections with the power shaft serving to minimize back lash in the wire forming stage.

8. A wire winding machine having two tool tables arranged at an angle to each other, wire winding mechanism having a rotating arbor for making a helix having a non-wound end located adjacent both of said tables, interchangeable mechanism including a wire working tool mountable on either of said tables in a position where said end may be worked and means including a cam shaft associated with each table for operating said tool on either table and forming said end.

9. A machine according to claim 8 in which said table having surfaces arranged at a right angle to each other, one surface being horizontal and the other vertical so that the wire may be readily shaped in any of the four quadrants of a circle, said tool supports being so constructed that two tools may be mounted at equal distances from the intersection of the table planes and the tools may be interchangeably mounted thereon.

10. A wire forming machine comprising a rotatable and reciprocable arbor, mechanism for rotating the arbor and moving it axially for coiling a wire helix thereon, a wire forming tool to form an end of the helix, a double tool support having two tool supporting surfaces arranged in planes at an angle to each other and close to the arbor, means for mounting the tool on either surface and on either side of the arbor, and power driven cams arranged for operating a tool in each of said mounted positions.

11. A machine according to claim 10 comprising two parallel power driven cam shafts having cams thereon associated with said tool supporting surfaces which are arranged for operating simultaneously two separate tools mounted on the two surfaces.

12. A wire forming machine comprising a double tool support having two tool supporting surfaces in planes arranged at an angle to each other, wire forming tools, means associated with each surface for mounting a tool thereon near the intersection of said planes, a reciprocable gripper for releasably seizing the free end of a supply wire which is movable to present the wire end to a tool mounted on either surface, power driven mechanism, means including a pitman driven continuously by said mechanism which reciprocates said gripper and thrusts the wire forward intermittently to said tool and mechanism operating in timed relation with the reciprocation of the gripper which causes the tool to form the wire.

References Cited

UNITED STATES PATENTS

| | | | |
|---|---|---|---|
| 834,842 | 10/1906 | Nutting | 140—71 |
| 1,190,868 | 7/1916 | Deats | 140—1 X |
| 1,947,449 | 2/1934 | Anderson et al | 140—103 |
| 2,134,469 | 10/1938 | Bergevin | 140—103 |
| 2,456,222 | 12/1948 | Stule | 140—103 |
| 2,843,159 | 7/1958 | Bonde et al. | 140—103 X |
| 2,873,767 | 2/1959 | Barnes | 140—103 X |
| 2,939,492 | 6/1960 | Lewis et al. | 140—103 X |
| 3,025,889 | 3/1962 | Clay | 140—71 |

WILLIAM J. STEPHENSON, *Primary Examiner.*